United States Patent [19]

Ramirez et al.

[11] 4,031,006

[45] * June 21, 1977

[54] VORTEX COAGULATION MEANS AND METHOD FOR WASTEWATER CLARIFICATION

[75] Inventors: Ernest R. Ramirez, Lemont; Dennis L. Johnson, Woodridge, both of Ill.

[73] Assignee: Swift and Company Limited, Chicago, Ill.

[ * ] Notice: The portion of the term of this patent subsequent to May 25, 1993, has been disclaimed.

[22] Filed: May 17, 1976

[21] Appl. No.: 687,236

Related U.S. Application Data

[63] Continuation-in-part of Ser. No. 666,341, March 12, 1976, abandoned.

[52] U.S. Cl. .................................. 210/44; 204/149; 210/221 P;512 R
[51] Int. Cl.² ........................................ B01D 12/00
[58] Field of Search ........... 204/149, 152; 209/162, 209/164, 166, 170; 210/44, 57, 205, 22 M, 221 P, 512 R; 261/79 A, 121–124

[56] References Cited
UNITED STATES PATENTS

| | | | |
|---|---|---|---|
| 2,935,840 | 5/1960 | Schoppe | 261/79 A X |
| 3,015,396 | 1/1962 | Quast | 210/221 P |
| 3,286,992 | 11/1966 | Armeniades et al. | 261/79 A X |
| 3,487,621 | 1/1970 | Bichet et al. | 261/79 A X |
| 3,669,883 | 6/1972 | Huckstedt et al. | 210/221 P |
| 3,842,004 | 10/1974 | Nagahama | 210/221 M |
| 3,932,282 | 1/1976 | Ettelt | 210/221 P X |
| 3,959,131 | 5/1976 | Ramirez et al. | 210/44 |
| 3,969,245 | 7/1976 | Ramirez | 210/44 |

*Primary Examiner*—Frank A. Spear, Jr.
*Assistant Examiner*—Robert H. Spitzer
*Attorney, Agent, or Firm*—Edward T. McCabe; Charles E. Bouton; Raymond M. Mehler

[57] ABSTRACT

Raw wastewater to be clarified is routed in an apparatus which directs the wastewater in an improved upwardly directed vortex path that is above and open to a source of dense microbubbles. Impurities within the wastewater are urged toward the periphery of the vortex and coagulate, while the bubbles tend to pass up through a central core of the vortex. The coagulated impurities and the bubbles approach the outlet of the vortex apparatus, whereupon a venturi-like effect is developed to accomplish an improved contacting of the coagulated impurities and the bubbles to form buoyant agglomerates. The wastewater and buoyant agglomerates flow together through the vortex outlet, after which the buoyant agglomerates may be permitted to float to the surface of the wastewater in a separate chamber.

23 Claims, 8 Drawing Figures

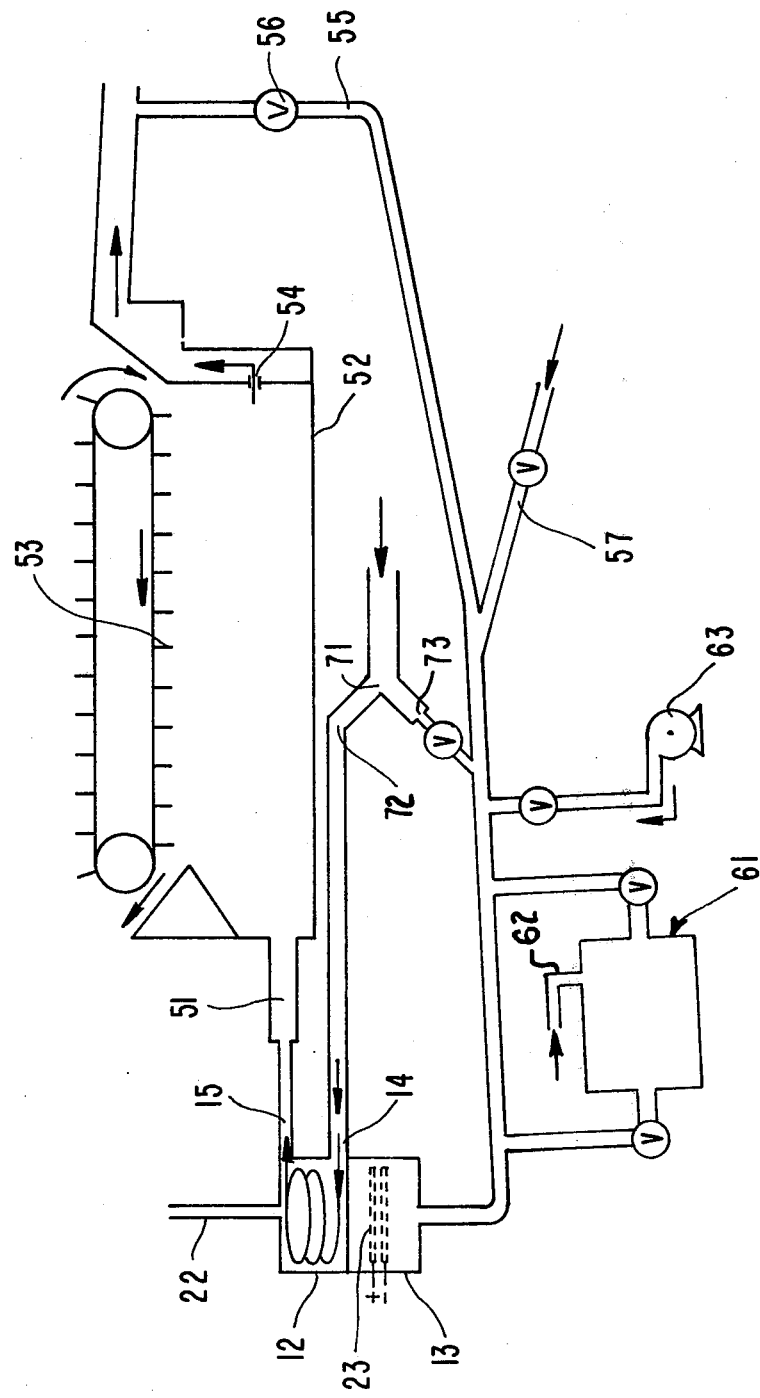

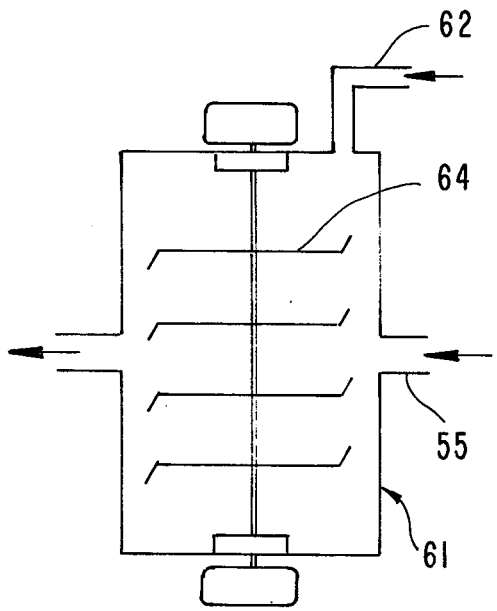
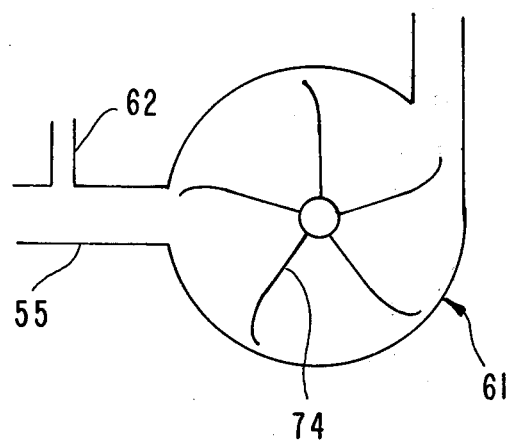
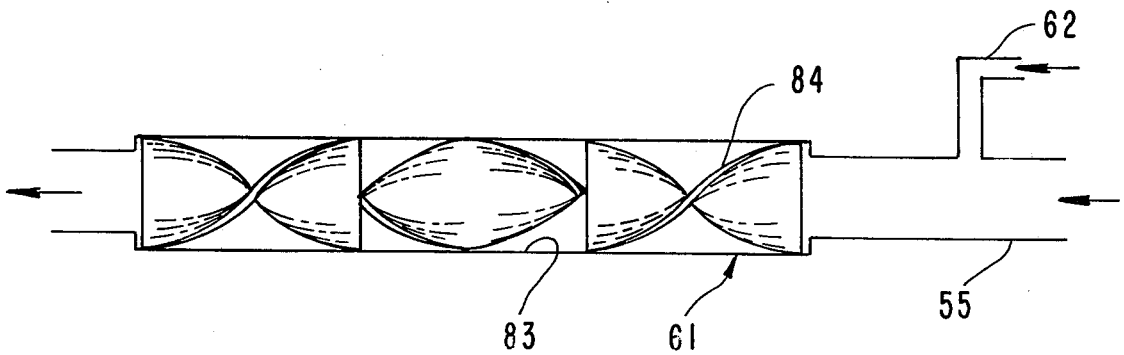

VORTEX COAGULATION MEANS AND METHOD FOR WASTEWATER CLARIFICATION

This is a continuation-in-part of U.S. Pat. Application No. 666,341, filed Mar. 12, 1976 now abandoned.

This invention relates to an improved vortex method and apparatus for rapidly mixing a flow of wastewater with a supply of bubbles to form buoyant agglomerates.

There are many municipal and industrial needs for efficient and effective removal of impurities, such as pollutants and valuable substances from various wastewaters. Such needs include the removal and recovery of fats and oils from meat rendering wastewaters, the removal of particulate and emulsified material from raw sewage effluents, the removal of impurities from tannery waters, and the removal of grit and other pollutants from laundry drainings.

It is well known in the prior art to utilize various means for floating impurities to the surface of the wastewater, wherefrom they can be skimmed or otherwise removed. Some of this prior art includes the passing of gases through a wastewater in an effort to float impurities toward the wastewater surface for separation from the wastewater. As had been disclosed in copending Ramirez and Johnson U.S. Pat. No. 3,959,131 and copending Ramirez U.S. Pat. No. 3,969,245, superior wastewater clarification can be achieved when a raw wastewater flow is first mixed with bubbles within a cell to form buoyant agglomerates, and thereafter having the agglomerates and wastewater flow together out of the cell and into a flotation tank for subsequent flotation and removal of the agglomerates from the thus clarified wastewater flow.

It has now been determined that more efficient results can be obtained, especially in conjunction with the treatment of large flow volumes, when the cell is structured as disclosed herein and when the present method of forming buoyant agglomerates is followed.

Therefore, it is an object of this invention to provide an improved method and apparatus for mixing a raw wastewater with bubbles to form buoyant agglomerates within the wastewater.

Another object of the present invention is an improved method and means for achieving an improved upwardly directed vortex mixing of a flowing wastewater with microbubbles prior to the transmittal of the wastewater flow to a flotation tank wherein buoyant agglomerates of impurities and bubbles may be separated from the wastewater flow.

Still another object of the invention is an improved method and means for coagulating impurities within a flow of wastewater and mixing these coagulated impurities with microbubbles to form buoyant agglomerates within a flowing wastewater.

This invention is an improved method and a means for rapidly forming buoyant agglomerates within a flow of wastewater including a tangential inflow to form an upwardly spiraling vortex column of wastewater in a cylindrical chamber positioned above a dense supply of bubbles. In the vortex column, the impurities in the wastewater are urged toward the periphery of the vortex column where coagulation of the impurities is favored. At the same time, the bubbles supply passes up through the vortex column, the bubble flow being concentrated along the axis of the column. Both the coagulated impurities and the bubble flow pass, in a venturi-like fashion, through a tangential outflow path to provide efficient contacting of the bubbles and the coagulated impurities to form buoyant agglomerates within the wastewater flow, which agglomerates may be later floated from the wastewater after a combined outflow of the buoyant agglomerates and wastewater from the cylinder chamber.

Additional objects, if not set forth specifically herein, will be readily apparent to those skilled in the art from the detailed description of the invention which follows and from the drawings in which:

FIG. 4 is a schematic illustration of the apparatus of the invention, showing alternate embodiments and its preferred communication with a typical flotation means.

FIG. 5 shows an alternate embodiment of the invention.

FIG. 6 shows another alternate embodiment of this invention.

FIG. 7 shows yet a further alternate embodiment of the invention.

Figure 1:
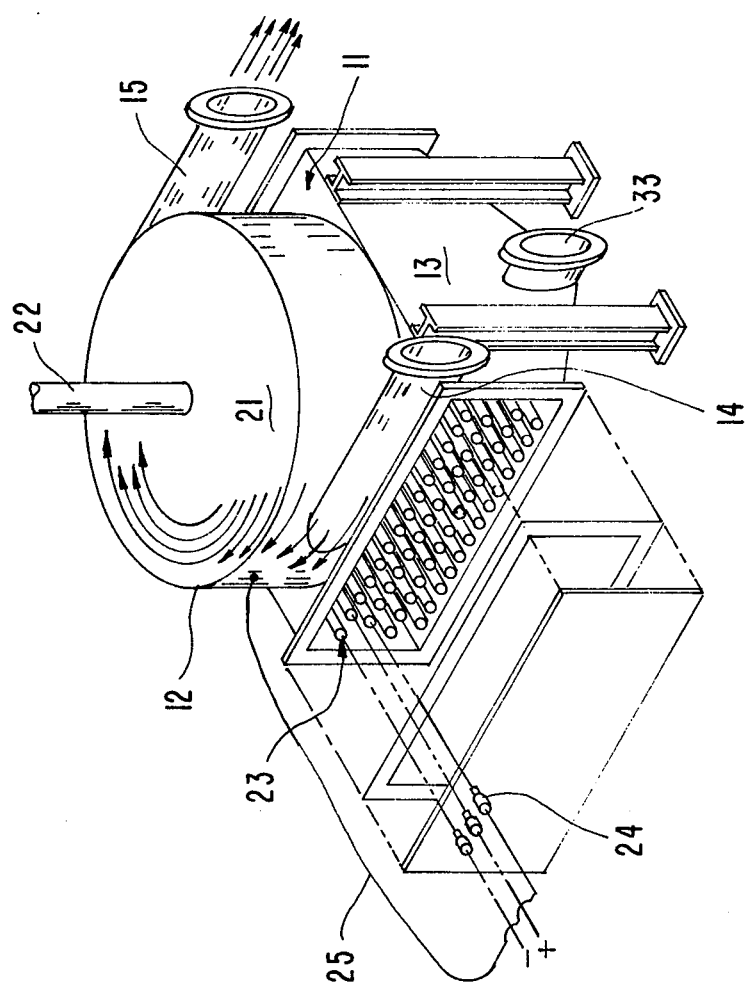
FIG. 1 is a perspective view, partially exploded, of the preferred apparatus of this invention.

Generally, the method of this invention is one in which a vortex column is formed by a tangential inflow and a tangential outflow of a wastewater flow within a cylindrical chamber, while a dense supply of bubbles enters the bottom of and passes upwardly through the vortex column. This upward bubble passage tends to proceed through a central core lying along the axis of the vortex column, while impurities within the wastewater are urged toward the periphery of the vortex column where they are concentrated. The thus concentrated impurities coagulate and begin to combine with bubbles as they flow within the vortex column. The coagulated impurities and the axially passing bubbles contact each other in a venturi-like manner as they pass from the vortex column to form buoyant agglomerates. These agglomerates are capable of floating to the surface of the wastewater, such surface floating being possible after the agglomerates, still within the wastewater flow, have passed out of the vortex column.

More particularly, in the preferred method, a wastewater flow is tangetially introduced into the bottom of a cylindrical chamber, forming a vortex column of wastewater. The vortex flow urges the wastewater toward the periphery of the vortex column and develops a centrifugal force on impurities within the wastewater that assists in their coagulation near the periphery of the vortex. Meanwhile, very fine bubbles are introduced into a zone below and open to the vortex column. Many of the bubbles migrate toward and pass upwardly through a central core generally along the axis of the vortex column. A tangential outflow path is provided at the top of the vortex column. The bubbles rising through the central core and the coagulated impurities flowing generally peripherally up the vortex column then combine within said tangential outflow path to form buoyant agglomerates of bubbles and impurities. The agglomerates remain mixed with the wastewater flow as the mixture passes through and out of the outflow path of the vortex column.

The buoyant agglomerates thus formed by the present method are easily separable by floating same within the wastewater after said flow out of the vortex volumn. This flotation may include the addition of a flocculant to the mixture of wastewater and buoyant agglomerates. Flocculants that will serve to combine the buoyant agglomerates into larger, more easily separated floc, include polymers that are well known as flocculants. Preferred flocculants are polyelectrolyte flocculants such as polyacrylic acrylamides, especially those of the anionic variety.

In the present method a superior vortex effect is achieved, the wastewater entering tangentially at the bottom of the vortex column and exiting tangentially at the top of the vortex column. In an especially advantageous embodiment of the present method, the outflow path is substantially parallel to and the outflow direction is generally opposite to that of the entering wastewater flow. This provides the greatest straight-line distance between the inflow area and the outflow area of the vortex column to thereby minimize any possible interference between the inflow path and the outflow path, which interference might disturb the formation and maintenance of the improved vortex column.

The vortex column provides a maximum wastewater velocity at the periphery of the vortex column, while the circular flow velocity near the axis of the vortex column approaches zero. For example, the calculated flow velocity at the periphery of a typical vortex column produced by the preferred method is 80 feet per minute for a column passing 300 gallons of wastewater in one minute; it is 150 feet per minute for a 600 gallon passage in one minute, 300 feet per minute for a 1,000 gallon passage in 1 minute, and 500 feet per minute for a 1,700 gallon passage in 1 minute. The vortex accordingly impresses substantially large centrifugal forces upon the impurities within the wastewater flow, forcing them to the periphery of the vortex column to thereby increase the possibility that the impurities will contact each other, usually with considerable collision velocity. This effect achieves a superior coagulation of impurities, which impurities coagula are themselves centrifugal urged toward the upwardly spiralling periphery of the vortex column.

The bubbles that are supplied by the bubble introducing zone below the vortex column rise into the vortex column. Since the bubbles are significantly less dense than either the wastewater or the wastewater impurities, they tend to migrate toward the axis of the vortex column and flow therethrough to assist in the formation of the central core of the vortex column. The core consists primarily of a stream of bubbles passing upwardly through the wastewater that is spiralling in the general vicinity of the central axis of the vortex column. As previously mentioned, the circular flow velocity of the wastewater at the central axis approximates zero and that of the central core surrounding the axis is much less than the circular flow velocity of the wastewater at the periphery of the vortex column. This velocity gradient is manifested by the centrifugal force acting upon each particle within the vortex column, with the most dense particles (generally the impurities) being carried along the upwardly spiralling periphery of the vortex column, and the least dense particles (the bubbles) being urged toward the central core in which they will rise. Accordingly, there is a forced segregation of impurities from bubbles as each flows through a large portion of the vortex column. This segregation has decided advantages.

First of all, this segregation directs the impurities to the periphery. At the periphery, the impurities can coagulate without significant interference from the bubbles. There also exist at the periphery certain conditions which assist the desired coagulation. The centrifugal force developed by the vortex column increase the collision velocity of the impurities to enhance coagulation, and it also forces the particulates into a reduced volume of water to decrease the average distance between particles and increase the probability that the particulates will contact each other.

Secondly, the segregation provides the advantage that coagulating impurities will traverse an increased path length during which the impurities can be coagulated. Since the impurities are urged toward the periphery of the vortex column, their path length within the vortex column will be approximately equal to the circumference of the vortex column multiplied by the number of revolutions completed by the vortex column. This number of revolutions will vary with the diameter and height of the vortex column and the rate and duration of wastewater flow through the vortex column as discussed in more detail elsewhere herein. Generally, in accordance with the preferred mode, these parameters are varied so as to achieve complete through the vortex column with about one-half minute to about three minutes. This rather rapid flow rate through the especially long spiralling path length is capable of being realized by the present method without sacrificing the effectiveness of forming the buoyant agglomerates.

Thirdly, the segregation of bubbles from impurities while they are being coagulated within the vortex column produces a superior venturi-type mixing of bubbles and impurities, which occurs along the tangential outflow path. This venturi-type of mixing is brought about by a rapid and thorough contacting of coagulated impurities with bubbles and forms the desired buoyant agglomerates within the wastewater flow. The venturi-type of mixing develops as the central core of bubbles abruptly reaches the top of the vortex column and speeds toward the periphery while being subjected to the influence of the rapid periphery velocity of the coagulated impurities and the accompanying peripheral wastewater flow. The flow of bubbles having been urged to the peripheral top of the vortex column near the tangential outflow path, the bubbles which had been rising generally vertically through the central core are accelerated to the velocity approximating the peripheral velocity. The accelerated bubbles and coagulated impurities are then contacted in a venturi-like fashion in the vicinity of the outflow path by the acceleration of the bubble flow into the peripheral top of the vortex column containing the flow of coagulated impurities and wastewater.

The desired segregation of the bubbles from the peripheral coagulating impurities flow is further enhanced, as are coagulating conditions in general, when the following optional steps are also taken. A charge-adjusting chemical is added to the wastewater before it flows into the vortex column, and an electric charge curtain peripherally surrounds the vortex column. It has been determined that the best results are obtained for most wastewaters when the chemical imparts a weak positive charge to the impurities and when the charge curtain is cathodic. This arrangement brings about the further advantage that corrosion of the metallic wall carrying the electric curtain is almost totally avoided by virtue of its being cathodic.

It is believed that this arrangement enhances the tendency of impurities to migrate toward the periphery of the vortex column, i.e., toward the negatively charged curtain, due to the action of electrostatic forces. Additionally, many of the impurities, after contact with the chemical, carry a weak positive charge and will actually contact the negatively charged curtain which will diminish the already weak positive charge on the individual impurities. This charge diminishing effect with decrease the likelihood that two impurities will fail to coagulate because they are of like charge. The coagulation of impurities is, of course, further enhanced when the charge-adjusting chemical is itself a coagulant, such as ferric sulfate or alum.

Due to the relatively high velocities developed within the vortex column, it is preferred that there be included a relatively high and narrow standing column of wastewater directly above and in communication with the vortex column. Such standing column permits the venting of undesirable fluid back pressures which might result in the event of an unanticipated stoppage of the flow of wastewater downstream of the vortex column. It is also possible that some bubbles may pass through this standing column, should the supply of bubbles exceed the bubble handling capacity of the tangential outflow path.

The present method achieves superior formation of buoyant agglomerates of impurities and/or coagulated impurities with bubbles within a very short period of time, even while treating significant quantities of commercial, industrial or municipal wastewaters. The dwell time within the vortex column, generally irrespective of its volume, need be only within the range of about one-half to about three minutes, preferably between one minute and one and one-half minutes.

The very fine bubbles needed for this process may be generated electrolytically, through gas dispersion or dissolution, or by a combination of electrolytic generation and gas dispersion or dissolution. Gas dispersion or dissolution methods can bring with them the advantages of being less expensive than electrolytically generated bubbles and of supplying a bubble source having substantial swirling or turbulence features to enhance the mixing the bubbles and pollutants in the vortex column. Irrespective of how the bubbles are actually formed, dense clouds of very fine bubbles are introduced into the bubble introducing zone below the vortex column so as to form the dense supply of microbubbles. The bubbles should range in diameter size from about 10 to 500 microns, preferably 20 to 300 microns, and ideally 30 to 150 microns. The dense supply of these bubbles should include about $10^6$ to $10^8$ bubbles per liter and account for about 0.1 to 10 volume percent of the wastewater flowing through the vortex column. If the conductivity (primarily a concern in electrolytic generation) and/or the surface tension (primarily a concern in gas dispersion) of a particular wastewater are not adequate to supply bubbles within the size and density parameters, then ionic species and/or surfactants should be added.

Ionic species, surfactants, or dissolution enhancers may be added directly to the main flow of wastewater before it enters the vortex column. However, this has the disadvantage of having to adjust the conductivity, surface tension, or other property of the entire flow of wastewater, although the adjustment is of primary importance only for the water that is decomposed, used as a gas dissolving medium, or used as a dispersion medium. Accordingly, when the particular wastewater being treated by this method requires adjustment of its physical properties, it is preferred that adjustment not be made to the entire wastewater flow.

This can be accomplished by adding a supplementary water inflow directly into the bubble introducing zone. This water may be raw or screened wastwater that is tapped from the raw wastewater flow; it may be wastewater that has been clarified by the present process; or it may be a separate supply of fluid. Whatever means are utilized, the chemicals to be added, if any, are injected into the supplementary water inflow before it enters the bubble introducing zone and before it is decomposed and/or dispersed or dissolved with gas.

Ionic species added to the supplemental inflow, when included, can also be coagulating and/or charge adjusting. Suitable ionic species include alum, ferric sulfate, sulfuric acid, calcium hydroxide a monovalent salt, a polyvalent salt and combinations of these. The quantities of ionic species needed will, of course, vary with the inherent conductivity of the water used. Preferably, the adjustment should enable adequate formation of the dense supply of bubbles described herein even at low voltages in the range of about 6 to 15 volts.

The quantity and type of surfactant used, if any, will vary with the water used. If the dispersion of gas embodiment is to be practiced, then it is essential that the dispersion medium have a surface tension of no greater than 60 dynes per square centimeter so that bubbles of the required bubble size will be formed. Bubbles of the adequate size and density mentioned herein form only with a surface tension in the range of 20 to 60, preferably 30 to 50 dynes per square centimeter. Almost any surface tension depressing agent, or surfactant, may be used for this purpose. Surface tension depressing agents may be characterized as wetting agents, detergents, or emulsifying agents. They may be anionic, cationic or nonionic. Specific examples include anionic or nonionic amine sulfonates of a coconut alkylolamide, nonionic surfactants of an ethoxylated nonyl phenol, soaps having a base containing stearates, cleates or laurates, and anionic detergents in the alkyl aryl sulfonate family.

Not only does a supplemental water inflow increase the efficiencies if adding chemicals such as surfactants or ionic species, but it also provides steady upward flow of bubbles into the vortex column, which will help to control disruptive effects that could be brought about by an excessive downward flow of raw wastewater at the inflow of the vortex column. If has been found that this arrangement is optimized when the supplemental water flow rate into the zone is approximately 7 volume percent of the volume of the zone per unit time of bubble generation. An acceptable range for this rate is between about 5 volume percent and about 15 volume percent.

When the bubbles are generated electrolytically, the efficiency of electrolytic bubble generation can be enhanced by decomposing the water substantially within an electrically shielded environment. This prevents the formation of electrical bridges which would dissipate the current intended for use in decomposition and which would cause hazardous electrical shock. The shielding environment may be provided by coating selected metallic parts with plastisol or the like and by placing a nonconductive sheet of material such as polypropylene between selected metallic parts and the electrolytic decomposition means.

A perspective view of the preferred apparatus of this invention is shown in FIG. 1. This device is referred to generally by reference numeral 11. A cylindrical chamber 12 having substantially no internal obstructions is mounted above and in communication with a bubble supply compartment 13. An inlet 14 is tangentially mounted along the bottom of chamber 12, and an outlet 15 is tangentially mounted along the top of chamber 12. The preferred arrangement of inlet 14 with respect to outlet 15 is shown: inlet 14 is substantially parallel to outlet 15 with inlet 14 and outlet 15 being oriented in substantially the same direction relative to chamber 12, such that wastewater enters inlet 14 in the direction opposite to that by which it exits through outlet 15. Of course, other relative arrangements of inlet 14 and outlet 15 are contemplated, provided outlet 15 is positioned such that the exit direction will be the same as the direction of the vortex flow.

Preferably, chamber 12 has a substantially closed top 21 with a stand pipe 22 mounted through said top 21. When bubbles are to be generated electrolytically, compartment 13 includes a plurality of electrodes 23, which are preferably mounted horizontally in one or more horizontal rows. This preferred arrangement has been found to achieve optimally advantageous results in that it supplies the smallest bubbles and densest supply thereof while minimizing interference among bubbles. Alternate electrodes are connected to either a positive or a negative terminal of a direct current supply through connector members 24. Irrespective of how the bubbles are generated, it is preferred that an electrical lead 25 connect chamber 12 with the negative terminal so as to provide cathodic protection from corrosion. Suitable switching means (not shown) may be included for reversing the polarity of each electrode 23 to maintain them in a relatively scale free state while maintaining the chamber 12 as a cathode.

Figure 2:
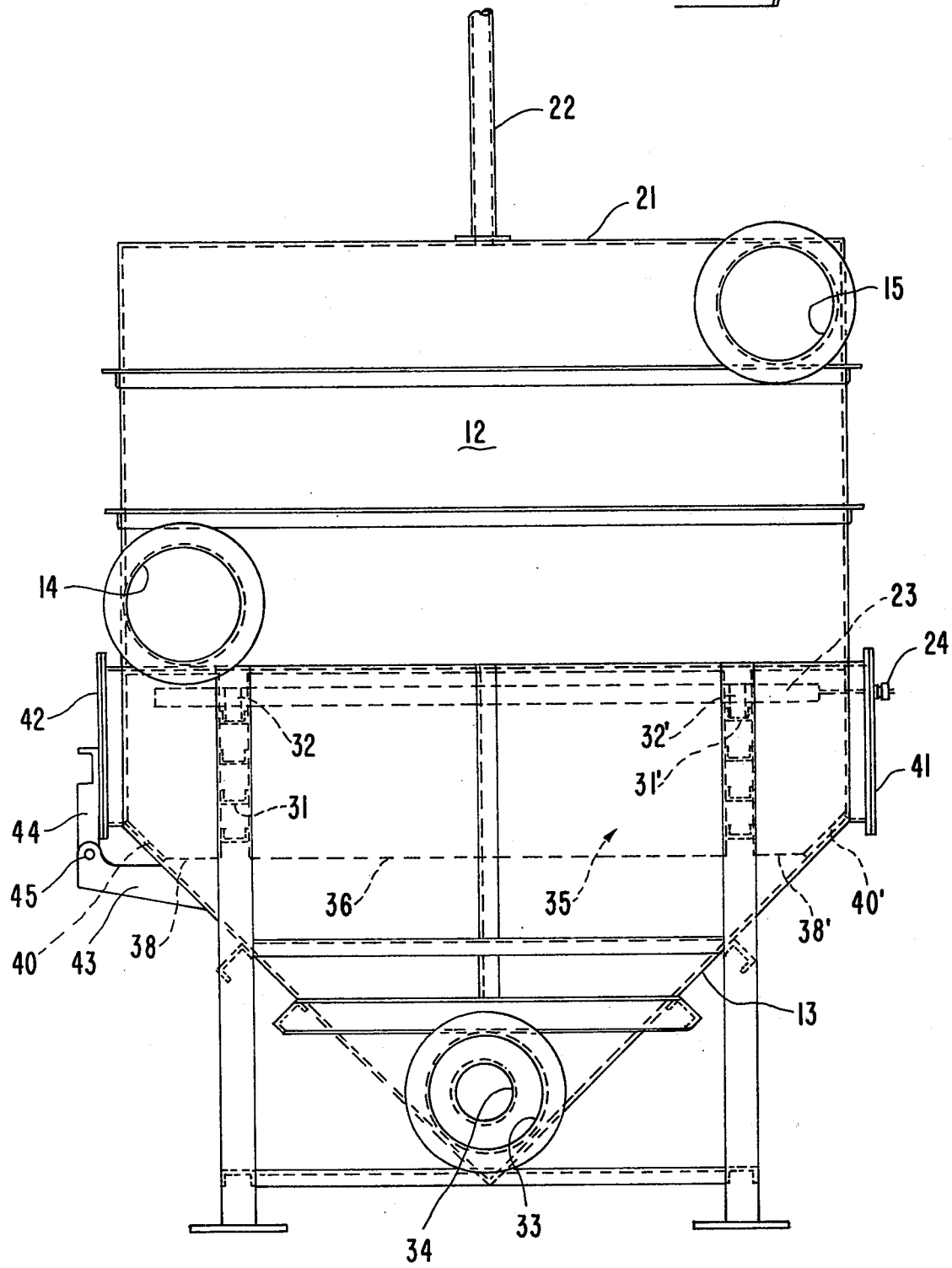
FIG. 2 is a plan view of the preferred apparatus.
Figure 3:
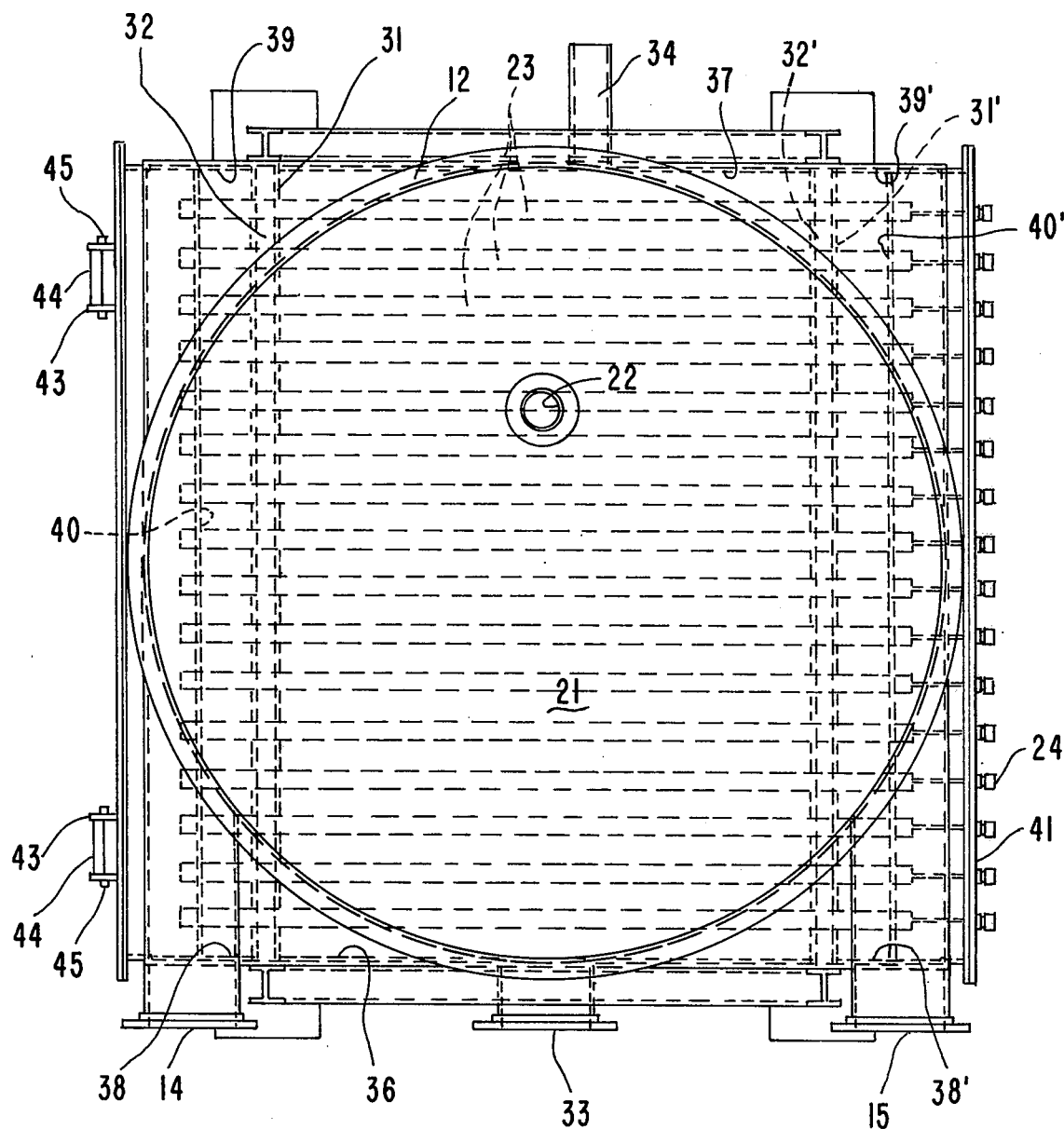
FIG. 3 is an elevation view of the preferred apparatus.

FIG. 2 shows details of the preferred electrode mounting arrangement. Mounted within compartment 13 are a plurality of pairs of brackets 31, 31'. A pair of brackets is required to mount each horizontal row of electrodes 23, as is a pair of saddle members 32, 32'. Saddle members 32, 32' are constructed of a non-conductive material such as wood or plastic so as to maintain the electrical integrity of each electrode 23 and enhance the formation of the electrolytically produced bubbles when the direct current is passed through the electrodes 23. Also shown is a purge 33 and a pipe 34 for facilitating the removal of debris from compartment 13 which preferably tapers toward purge 33 as shown. Either purge 33 or pipe 34 can also be included in a means for introducing a supplementary water supply or a supply having an ionic species and/or a surfactant into compartment 13. FIG. 3 more precisely discloses the preferred relative tangential communications between chamber 12 and inlet 14 and between chamber 12 and outlet 15.

As can be seen in FIGS. 2 and 3, the preferred apparatus includes shielding means, generally identified by reference numeral 35, provided to prevent electrical current bridging between electrodes 23 and adjacent conductive parts of compartment 13. Included in the preferred shielding means 35 are side shields 36, 37, and shields 38, 39, 38' and 39', and offset transverse shields 40, 40'. Also included may be a non-conductive coating on the saddle members 32, 32' and on the brackets 31, 31' as well as on other brackets or conductive structural members that are closely adjacent to the electrodes.

In order to protect electrode connector members 24 and the associated electrical wiring from damaging impacts, it is preferred that a cover assembly 41 be provided transverse to one end of electrodes 23 on the outside surface of electrode compartment 13. Similar protection is preferably provided for the other end of electrodes 23 by a hinged cover 42. Associated with the cover 42 are the brackets 43, 44 and pins 45. Cover 42 also provides for easy access to the electrodes 23 for the purpose of replacement or repair or for the purpose of adding or subtracting electrodes to vary the number of electrodes mounted within compartment 13.

The preferred communication of device 11 with subsequent flotation means is depicted in FIG. 4. This drawing shows precisely that the buoyant agglomerates formed within chamber 12 flow unseparated from and together with substantially the entire water flow out of chamber 12 through outlet 15. The water and buoyant agglomerates flow may then enter a conduit 51, which is in communication with an open flotation tank 52. If desired, a flocculant may be injected into conduit 51 so as to enhance the combination of the buoyant agglomerates with each other. Once the agglomerates and the wastewater flow are within tank 52, the agglomerates may float to the surface of the wastewater for removal by suitable means, such as rotating skimming bars 53, while the thus clarified wastewater flows out through a discharge opening 54. The flotation of skimmings to the surface of tank 52 may be aided by providing a flotation bubble supply means (not shown) for passing a substantial laminar flow of bubbles from near the bottom to the surface of tank 52.

The apparatus may also include a return conduit 55 for transporting clarified water from tank 52 and replenishing the supply of water being decomposed within the compartment 13. Conduit 55 may communicate with compartment 13 by way of purge 33, pipe 34, or other similar means. The rate of water flow can be suitably controlled by valve 56 or a similar means. Alternatively, an independent valve water source 57 may be provided for replenishing the water supply within the compartment 13.

FIG. 4 also illustrates alternate embodiments of device 11. One such embodiment allows for bubbles other than electrolytically produced bubbles to be included in the bubble supply compartment 13. Depending upon the particular wastewater being treated, these alternate embodiments may or may not include electrodes 23. Being able to reduce the number of electrodes 23 or to completely eliminate them usually lowers capital and operating costs associated with the use of electrical energy to decompose water.

Figure 8:
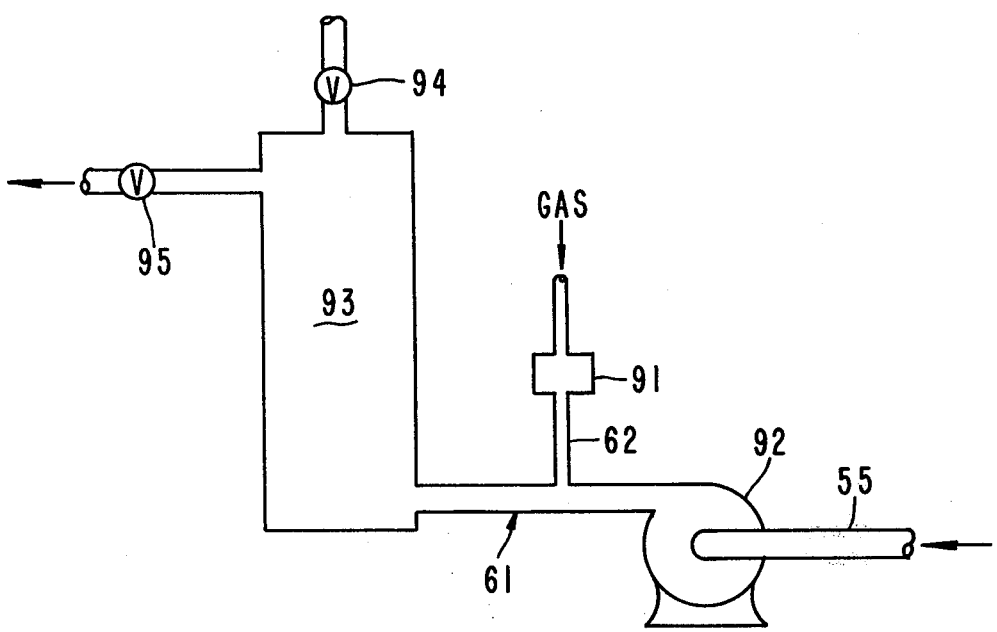
FIG. 8 shows one further alternate embodiment of the invention.

In one of these embodiments, a gas dispersion or dissolution means generally referred to by numeral 61 is in upstream communication with the bubble supply compartment 13. Means 61, when used to disperse gas, develops high shear between a gas phase and an aqueous phase. It includes a source of gas 62, such as air, for introduction into the liquid medium, usually water. Means 61 may be a high speed agitator, a high speed blender or disperser as depicted in FIG. 5; it may be a centrifugal pump as depicted in FIG. 6; it may be a static mixer as depicted in FIG. 7; or it may be a pressurized gas dissolver as depicted in FIG. 8. It may, especially when means 61 is a disperser, also include a surfactant injector 63 to lower the surface tension of the medium supplied to the preferred range for dispersion, to between about 20 to 60 dynes per square centimeter. At this surface tension range, the required bubble densities within means 61 can be achieved even when dispersion techniques only are used. These densities generally range from about 5 to about 20 volume percent bubbles, however incorporated within means 61. If these densities are not achieved, the removal of impurities will be severely lessened. Once the gas is introduced in means 61, the water flow continues into compartment 13 either through a single conduit as shown or through a plurality of conduits to aid in the distribution of the microbubbles throughout the horizontal extent of compartment 13. These conduits may include outlet 33 or pipe 34.

Another alternate embodiment is illustrated in FIG. 4 whereby a joint member 71 is provided along the flow of raw wastewater. One outlet 72 communicates with inlet 14, and the other outlet 73 is in valved communication with compartment 13 to provide a supplementary water inflow thereto.

The means 61 of FIG. 5 includes movable blades 64 for dispersing gas from source 62 within water from conduit 55 to form microbubbles. FIG. 6 shows a means 61 which is a centrifugal pump having impellers 74 for developing the required high shear between gas from source 62 and water from conduit 55 so as to form an aqueous gas dispersion.

Contrary to the mechanical dispersion apparatus shown in FIGS. 5 and 6, the means 61 of FIG. 7 achieves dispersion but has no moving parts. Instead, the required dispersion high shear is developed by a plurality of vanes 84 which are stationary and which are in substantial contact with inner wall 83 of means 61. Water flowing through conduit 55 and gas supplied through source 62 flow together and impinge upon and twist through and along the vanes 84 so as to form an aqueous gas dispersion that then flows to compartment 13.

In means 61 of FIG. 8, the gas source 62 is pressurized, preferably by a source of compressed air (not shown) having a pressure somewhat greater than that immediately downstream thereof, for example 60 pounds per square inch of pressure. The flow of source 62 is measured by a flow meter 91 so that the density of bubbles in means 61 may be maintained so as to supply on the order of 0.1 to 10 volume percent bubbles in the wastewater flowing through chambers 12. Source 62 enters means 61 downstream of a liquid pump, preferably a centrifugal pump 92. Downstream of the gas source 62 is a pressure vessel 93 for holding the gas and the liquid at a pressure of about 35 to 75, preferably about 50 pounds per square inch. Dwell time within vessels is a short period of about ½ to 5 minutes preferably about 2 minutes. Vessel 93 usually includes a constant purge release valve 94 for permitting the escape of excess gas, usually accompanied by a liquid mist.

Within the outlet of vessel 93 is a constant pressure outlet valve 95 for maintaining the pressure within vessel 93 while permitting passage of a dissolved gas/liquid flow into compartment 13. By this arrangement, the dissolved gas/liquid flow drops to atmospheric pressure upon passing through valve 95 so that when this flow enters compartment 13 it is already under approximately the same pressure conditions that exist on compartment 13. As a result, although the embodiment shown in FIG. 8 uses pressurization to dissolve the gas, the flow of dissolved gas supplied to compartment 13 is not pressurized, thereby achieving the same general bubble flow characteristics within compartment 13 and vortex chamber 12 that are discussed herein and that are present in all embodiments of this invention.

The following examples are set forth as illustrative embodiments of the invention and are not to be taken in any manner as limiting the scope thereof as defined by the appended claims.

EXAMPLE I

A laboratory test was conducted under batch conditions to determine the effects accomplished by the vortex column of the preferred method. A barrel cleaning wastewater, containing caustic lye solutions, oils, and other organic material was placed into a four inch chamber above a grid of 25 precious metal electrodes. The chamber had a 1 ½ gallon capacity. The wastewater supply was treated with 800 ppm of ferric sulfate and 200 ppm of calcium hydroxide before the wastewater entered the chamber.

In one test, it was then subjected to a current flow of 3 ½ ampere minutes per gallon of wastewater to generate a dense supply of microbubbles which were allowed to churn randomly within the wastewater. An improved vortex column of the present method was not formed. The current was terminated and an anionic polymer flocculant was added to achieve a final agglomeration. The lower, clarified wastewater layer exhibited a Jackson turbidity reading of 85 units.

An identical test was conducted, except that a vortex column according to the present method was simultated by means of a small motorized paddle stirrer placed vertically along the central axis of the chamber. The stirrer was activated while the dense supply of microbubbles was being generated. The clarified wastewater exhibited a significantly improved Jackson turbidity reading of only 18 units.

EXAMPLE II

Tests similar to those of Example I were conducted except that the electrode chamber was replaced with a blender so that the dispersed air microbubbles, instead of electrolytically generated microbubbles, were supplied. In these tests, a tannery wastewater having 1400 ppm BOD, 880 ppm of suspended solids, and 480 ppm of hexane extractables were treated with 1200 ppm of ferric sulfate and 600 ppm of lime. Then, dispersed air microbubbles were added. In one test, a vortex column according to the present method was simultated by means of a manually operated vertical paddle stirrer which was moved in a circular path between the central axis and the inside walls of the chamber. In another test, no vortex column was formed, the treated wastewater and microbubbles being randomly churned. After final agglomeration was accomplished with 10 ppm of polymer flocculant, water clarity tests were conducted. The wastewater treated with the vortex column had a Jackson turbidity reading of 25 units, while that treated with random churning had a Jackson turbidity reading of 52 units.

EXAMPLE III

The apparatus substantially as shown in FIGS. 1, 2 and 3 was placed on stream at a commercial tannery having an average wastewater discharge of about 400 gallons per minute. Downstream of this apparatus was a flotation tank also having electrodes. All electrodes were connected in parallel to the power source through a single rectifier set for 4300 amps at 6.6 volts. The entire 400 gallons per minute was fed through the tangential inlet. A total of 1000 ppm of ferrifloc and 600 ppm of lime were added to the influent, and added to the flow from the cylindrical chamber were 8 ppm of a polyacrylic acrylamide polymer flocculant having about 50 to 90 weight percent acrylamides or methacrylamides and about 10 to 50 percent acrylic or methacrylic acid or water soluble salts and characterized by a weight average molecular weight of about 2 million, usually about 7 to 12 million as measured by light scattering techniques. The skimmings floated and removed in the tank analyzed as having 10 weight percent solids, and they accumulated at an average rate of 6 gallons per minute. The wastewater itself was analyzed as follows:

| Pollutant | Influent | Effluent |
|---|---|---|
| Total BOD | 674 ppm | 216 ppm |
| Suspended Solids | 1092 ppm | 101 ppm |
| Hexane Extractables | 592 ppm | 44 ppm |
| Dissolved Oxygen | 6.3 ppm | 7.3 ppm |
| pH | 5.1 | 7.5 |
| Trivalent Chromium | 65 ppm | 4.7 ppm |

EXAMPLE IV

This example illustrates the ability of the preferred apparatus to be readily modified so as to continuously treat a wide range of wastewater flow rates while maintaining a constant chamber dwell time of only about one minute. For this example, the diameter of the cylindrical chamber is maintained with a square horizontal cross section that is 7 ½ feet on each side and with a height of about 20 inches. The inlet and outlet each have an internal diameter of about 10 inches. In order that the calculated dwell time of about one minute may be maintained as the rated flow of wastewater through the cell increase, it is necessary to calculate increases in the height of the cylindrical chamber, the approximate number of revolutions within the chamber, and the adjustments needed to maintain the proper bubble density. When the bubbles are generated electrolytically, the bubble density variation is accomplished by adjusting the number of electrodes and/or the current so as to maintain the total amperage at about 1 to about 4 ampere minutes per gallon of wastewater flow. The other variables calculate out approximately as follows:

| Rated Flow of Wastewater | Dwell Time | Height of Vortex Chamber | Approximate Number of Revolutions Within Chamber |
|---|---|---|---|
| 680/gal/min. | 1 min. | 24 in. | 7 |
| 850 gal/min. | 1 min. | 30 in. | 9 |
| 1020 gal/min. | 1 min. | 36 in. | 12 |
| 1190 gal/min. | 1 min. | 42 in. | 15 |
| 1360 gal/min. | 1 min. | 48 in. | 16 |
| 1530 gal/min. | 1 min. | 54 in. | 17 |
| 1700 gal/min. | 1 min. | 60 in. | 18 |

EXAMPLE V

This example illustrates advantageous results that can be achieved for certain wastewaters by practicing the alternate embodiment which utilizes a supplementary water inflow to the bubble introducing zone. The total flow of wastewater from an algae-infested lagoon was split so that 90 volume percent of the wastewater flowed into the inlet of the vortex column, while the split-off 10 volume percent was treated with 1500 ppm of alum as a ionic species and then fed into the bottom of the bubble supply compartment having a plurality of electrode pairs. A total of only 18 volts were needed to generate 160 amperes of current. The microbubbles thus formed in the split-off flow were combined with the remaining 90 percent of the wastewater within the vortex column. The buoyant agglomerates accompanied the flow out of the vortex column, polymer flocculant was added, and the impurities were floated from the thus clarified wastewater. A total of 800 gallons of wastewater were satisfactorily clarified.

The same source of wastewater was then treated in exactly the same manner, except that 10 percent of the flow was not split off and the same quantity of alum was added to the entire flow to achieve a 150 ppm concentration before its entrance into the vortex column. Satisfactory clarification again resulted, but over 30 volts were required to achieve the 1600 ampere flow needed to generate the microbubbles of adequate size and density.

EXAMPLE VI

As a further example of the alternate embodiment illustrated in Example V, a packinghouse wastewater flow of 600 gallons per minute was treated. In one arrangement, the entire flow of 600 gallons per minute of raw wastewater was treated with 300 ppm ferric sulfate just before it entered the vortex column, only 450 amperes were drawn at the electrodes when 14 volts were applied. By making the following modification, 950 amperes were drawn by the 14-volt supply. A flow of 10 volume percent of the total wastewater floc was diverted to the bubble supply compartment and electrodes. The diverted flow amounted to 60 gallons per minute, to which was added to 3000 ppm ferric sulfate so that the concentration within the vortex column was still only 300 ppm.

EXAMPLE VII

This example illustrates another alternate embodiment in which the surface tension of a wastewater is adjusted to permit the formation of a bubble supply of adequate density and which is produced by dispersion. Treated was a beef packinghouse wastewater having 1200 ppm total BOD, 700 ppm suspended solids, 650 ppm hexane extractables, and a surface tension of about 70 dynes per square centimeter, greater than that called for by the present invention. At this surface tension, only air bubbles of relatively large diameter could be formed, and the density of the bubbles thus dispersed was less than 0.4 volume percent of the wastewater. When the thus dispersed bubbles were used to treat the wastewater flow at a volume ratio of about 1 to 10, it was found that this bubble density was inadequate to flocculate and float the wastewater impurities.

A volume of 150 cc of tap water was combined with 20 ppm of an amine sulfonate coconut alkyl olamide surfactant to lower its surface tension to about 42 dynes per square centimeter and was passed into an air disperser until it contained about 10 volume percent microbubbles, which is within the preferred range of 5 to 20 volume percent of the dispersion medium. This air dispersion was flowed into one liter of the raw wastewater and allowed to mix for 30 seconds; the quantity of microbubbles was about 1.5 volume percent of the wastewater. After polymer flocculant addition and flotation, the treated water contained 400 ppm total BOD, 320 ppm suspended solids, and 75 ppm hexane extractables.

EXAMPLE VIII

A test similar to Example VII was run on a tannery wastewater having 1400 ppm total BOD, 880 ppm suspended solids, and 480 ppm hexane extractables. Added directly to this wastewater was 1200 ppm alum and 600 ppm lime, Since this wastewater had an acceptable surface tension of 38 dynes per square centimeter, it was placed directly into a blender until 15 volume percent of microbubbles were generated. After the addition thereof to the wastewater, followed by polymer flocculation and flotation, the treated wastewater was found to contain 250 ppm total BOD, 180 ppm suspended solids, 15 ppm hexane extractables, and to have a turbidity reading of 25 Jackson turbidity units.

EXAMPLE IX

Tannery wastewater having 1100 ppm BOD, 850 ppm suspended solids, 620 ppm hexane extractables, and exhibiting a turbidity of about 5000 Jackson Turbidity Units was treated with dissolved microbubbles in a vortex chamber. This wastewater was treated with 1100 ppm of ferric sulfate, 600 ppm of calcium hydroxide, and then submitted to total dissolved air pressurization for 3 minutes at a pressure of 50 pounds per square inch. After pressure release, this wastewater was subjected to the simulated vortex column of Example I for 1 minute. Then 6 ppm of polymer flocculant was added and the floc thus formed floated to the surface for removal. The thus clarified water was analyzed as having 210 ppm BOD, 120 ppm suspended solids, 25 ppm hexane extractables, and a turbidity reading of 30 Jackson Turbidity Units.

Obviously, many modifications an variations of the invention as hereinbefore set forth may be made without departing from the spirit and scope thereof, and only such limitations should be imposed as are indicated in the appended claims.

We claim:

1. An improved vortex coagulation method for wastewater clarification, comprising the steps of: tangentially introducing a flow of wastewater having impurities into the bottom of a vortex column having a vertical axis; flowing said wastewater flow in an upward spiral through said vortex column; urging the impurities toward the periphery of the vortex column; coagulating impurities near the periphery; supplying a dense zone of bubbles below said vortex column; passing said bubbles upwardly through said vortex column, said bubble passage being concentrated in a central core lying along said axis; establishing a tangential outflow path for the water, bubbles and impurities; and contacting said bubbles with said impurities to form buoyant agglomerates of bubbles and impurities, said contacting being in a venturi-like manner within said outflow path.

2. The method of claim 1, wherein said upward bubble passage is assisted by supplying a supplemental water flow into said dense zone of bubbles, said supplemental flow being at a flow rate range of approximately 5 to 15 volume percent of the dense zone.

3. The method of claim 1, further comprising forming a standing column of wastewater directly above and in communication with said vortex column.

4. The method of claim 1, wherein said step of supplying the dense zone of bubbles includes adding an ionic species, a surfactant, or both into said zone, whereby the bubbles have a diameter range of about 20 to 300 microns and a density of about $10^6$ to $10^8$ bubbles per liter.

5. The method of claim 4, wherein said step of adding a surfactant lowers the surface tension of the water to about 20 to 60 dynes per square centimeter.

6. The method of claim 1, further comprising adding a charge adjusting chemical to said wastewater flow before said tangential introducing step to impart a weak positive charge to said impurities, whereby said urging of charged impurities toward the periphery of the vortex column assists in forming coagula of charged impurities; supplying a negatively charged curtain which peripherally surrounds said vortex column; contacting some of the charged impurities and charged coagula with said curtain to further weaken the positive charge and promote further coagulation of impurities and coagula.

7. The method of claim 1, wherein said bubble supplying step is accomplished electrolytically in an electrically shielded environment.

8. The method of claim 1, wherein said bubble supplying step is accomplished by dispersing a gas into a dispersion medium having a surface tension between about 20 to 60 dynes per square centimeter.

9. The method of claim 1, further comprising dissolving a gas under pressure into a liquid medium followed by release of such pressure to approximately atmospheric pressure prior to said step of supplying a dense zone of bubbles below said vortex column.

10. The method of claim 1, further comprising floating said buoyant agglomerates to the surface of said wastewater flow downstream of said tangential outflow path.

11. The method of claim 1, wherein the amount of time elapsed between the tangential introducing step and the flow through the tangential outflow path is from about ½ minute to about 3 minutes.

12. The method of claim 1, wherein the wastewater is a flow of rendering water.

13. An improved vortex coagulation apparatus for wastewater clarification comprising: a bubble supply compartment; a means for introducing a supplemental water supply into the compartment; a cylindrical chamber having a substantially vertical axis, said chamber being mounted above and in communication with said compartment; an inlet in tangential communication with the peripheral bottom of said chamber; and an outlet in tangential communication with the peripheral top of said chamber.

14. The apparatus of claim 13, wherein said cylindrical chamber has substantially no internal obstructions.

15. The apparatus of claim 13, wherein said outlet is substantially parallel to said inlet and the inlet and outlet are oriented in substantially the same direction relative to said chamber.

16. The apparatus of claim 13, further comprising a cathodic electrical lead connected to said cylindrical chamber, said lead being in electrical communication with a supply of direct current.

17. The apparatus of claim 13, wherein said cylindrical chamber has a substantially closed top, and a stand pipe is mounted above and in communication with said top.

18. The apparatus of claim 13, further comprising a conduit communicating the tangential outlet with a flotation tank.

19. The apparatus of claim 18, further comprising a return conduit communicating a discharge opening of said tank with said supplemental water supply introducing means.

20. The apparatus of claim 13, wherein said means for supplying bubbles into the compartment includes a plurality of horizontally mounted electrodes and shielding means located between said electrodes and portions of said compartment adjacent thereto.

21. The apparatus of claim 13, wherein said means for supplying bubbles into the compartment is a gas dispersion means.

22. The apparatus of claim 21, wherein the gas dispersion means is a static mixer having stationary vanes.

23. The apparatus of claim 13, wherein said means for supplying bubbles into the compartment is a pressurized gas dissolving means.

* * * * *

UNITED STATES PATENT OFFICE
CERTIFICATE OF CORRECTION

Patent No. 4,031,006  Dated June 21, 1977

Inventor(s) Ernest R. Ramirez and Dennis L. Johnson

It is certified that error appears in the above-identified patent and that said Letters Patent are hereby corrected as shown below:

The patent should show on its face that it is assigned to Swift & Company of Chicago, Illinois.

Signed and Sealed this

Sixth Day of December 1977

[SEAL]

Attest:

RUTH C. MASON  
Attesting Officer

LUTRELLE F. PARKER  
Acting Commissioner of Patents and Trademarks